US008963886B2

(12) United States Patent
Wassvik

(10) Patent No.: US 8,963,886 B2
(45) Date of Patent: Feb. 24, 2015

(54) TOUCH-SENSING DISPLAY PANEL

(71) Applicant: FlatFrog Laboratories AB, Lund (SE)

(72) Inventor: Ola Wassvik, Brosarp (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 13/742,958

(22) Filed: Jan. 16, 2013

(65) Prior Publication Data

US 2013/0127790 A1 May 23, 2013

Related U.S. Application Data

(63) Continuation-in-part of application No. 13/548,749, filed on Jul. 13, 2012.

(60) Provisional application No. 61/507,164, filed on Jul. 13, 2011.

(51) Int. Cl.
*G09G 5/00* (2006.01)
*G06F 3/042* (2006.01)

(52) U.S. Cl.
CPC .............. *G06F 3/042* (2013.01); *G06F 3/0421* (2013.01); *G06F 2203/04109* (2013.01)
USPC ......... 345/175; 345/173; 345/176; 178/18.09

(58) Field of Classification Search
USPC ..................... 345/173–178; 178/18.01–19.01
See application file for complete search history.

(56) References Cited

U.S. PATENT DOCUMENTS

| 7,042,444 | B2 | 5/2006 | Cok |
| 7,202,856 | B2 | 4/2007 | Cok |
| 7,432,893 | B2 | 10/2008 | Ma et al. |
| 7,613,375 | B2 * | 11/2009 | Shimizu ................. 385/129 |
| 2004/0140960 | A1 | 7/2004 | Cok |
| 2004/0251821 | A1 | 12/2004 | Cok |

(Continued)

FOREIGN PATENT DOCUMENTS

| EP | 1471459 A2 | 10/2004 |
| EP | 2336859 A1 | 6/2011 |

(Continued)

OTHER PUBLICATIONS

Cornelissen et al. "Injecting Light of High-Power LEDs into Thin Light Guides", International Optical Design Conference 2010, vol. 7652, pp. 765212-1-765212-6, 2010.

(Continued)

*Primary Examiner* — Jennifer Nguyen
(74) *Attorney, Agent, or Firm* — Harness, Dickey & Pierce, P.L.C.

(57) ABSTRACT

A touch-sensing display panel, comprising a plurality of image-forming pixel elements; a planar light guide with a first refractive index, having a front surface forming a touch-sensing region and an opposite rear surface facing the pixel elements; a plurality of light emitters arranged at a peripheral region of the panel to emit light into the light guide for propagation therein through total internal reflection; a plurality of light detectors disposed at the peripheral region for receiving light from the light guide; and an optical layer disposed at the rear surface of the light guide to cover a plurality of the image-forming pixel elements in at least a central region of the panel, wherein said optical layer is configured to reflect at least a part of the light from the emitters impinging thereon from within the light guide.

22 Claims, 8 Drawing Sheets

(56) References Cited

U.S. PATENT DOCUMENTS

| | | | |
|---|---|---|---|
| 2008/0074401 A1 | 3/2008 | Chung et al. | |
| 2008/0121442 A1 | 5/2008 | Boer et al. | |
| 2008/0150848 A1 | 6/2008 | Chung et al. | |
| 2008/0284925 A1 | 11/2008 | Han | |
| 2010/0079382 A1 | 4/2010 | Suggs | |
| 2010/0097348 A1* | 4/2010 | Park et al. | 345/175 |
| 2010/0315379 A1 | 12/2010 | Allard et al. | |
| 2011/0084939 A1 | 4/2011 | Gepner et al. | |
| 2011/0199340 A1 | 8/2011 | Aikio et al. | |
| 2011/0221705 A1 | 9/2011 | Yi et al. | |
| 2011/0221997 A1 | 9/2011 | Kim et al. | |
| 2011/0234537 A1* | 9/2011 | Kim et al. | 345/175 |
| 2012/0086673 A1 | 4/2012 | Chien et al. | |
| 2012/0268427 A1* | 10/2012 | Slobodin | 345/175 |
| 2014/0071653 A1* | 3/2014 | Thompson et al. | 362/19 |

FOREIGN PATENT DOCUMENTS

| | | |
|---|---|---|
| WO | WO 2007/058924 | 5/2007 |
| WO | WO 2009/077962 | 6/2009 |
| WO | WO 2010/064983 | 6/2010 |
| WO | WO 2011/068761 | 6/2011 |

OTHER PUBLICATIONS

U.S. Office Action issued in U.S. Appl. No. 13/548,749, dated Jun. 4, 2014.

International Search Report dated Dec. 4, 2013, issued in International Application No. PCT/SE2013/050330.

International Search Report dated Oct. 8, 2013, issued in International Application No. PCT/SE2013/050024.

U.S. Office Action dated Dec. 23, 2013, issued in U.S. Appl. No. 13/548,749.

* cited by examiner

TOUCH-SENSING DISPLAY PANEL

This is a Continuation in part that claims priority under 35 U.S.C. §120 to U.S. Application Ser. No. 13/548,749, filed Jul. 13, 2012, which further claims benefit of Provisional U.S. Application No. 61/507,164, filed Jul. 13, 2011.

TECHNICAL FIELD

The present invention relates to touch sensing systems and especially to display devices that offer touch sensitivity.

BACKGROUND ART

Display devices with touch sensitivity are used today in a wide variety of applications such as touch pads in laptop computers, all-in-one computers, mobile phones and other hand-held devices, etc. It is often a desire to provide these electronic devices with a relatively large touch sensing display and still let the devices be small and thin.

There are numerous techniques for providing a display device with touch sensitivity, e.g. by adding layers of resistive wire grids or layers for capacitive touch-sensing or by integrating detectors in the display device. The major drawback of these techniques is that they reduce the optical quality of the display device, by reducing the amount of light emitted from the display or by reducing the number of active pixels of the display device.

U.S. Pat. No. 7,432,893 discloses a touch sensing system that uses FTIR (frustrated total internal reflection) to detect touching objects. Light emitted by a light source is coupled into a transparent light guide by a prism, then propagates inside the light guide by total internal reflection where after the transmitted light is received at an array of light detection points. The light may be disturbed (frustrated) by an object touching the light guide, whereby a decrease in transmitted light is sensed at certain light detection points. Providing a display device with this touch sensing system would add an undesired thickness and complexity to the display device.

WO2009/077962 also discloses a touch sensing system that uses FTIR to detect touching objects. Disclosed is a light guide with a tomograph having signal flow ports adjacent the light guide, the flow ports being arrayed around the border of the light guide. Light is emitted into the light guide by the flow ports and propagates inside the light guide by total internal reflection where after the transmitted light is detected at a plurality of flow ports. The light may be disturbed by an object touching the light guide. Providing a display device with this touch sensing system would add an undesired thickness and complexity to the display device.

US20040140960 shows a system which makes use of a different type och touch-sensing mechanism, namely by allowing beams of light to pass over the top surface of an OLED display through a prism or mirror system, and detecting obstruction of those beams. This document also proposes to use OLEDs for the light emitters. Such a design will be comparatively thick and also sensitive to contamination at the edges of the light-deflecting mechanism.

US20080150848 discloses an OLED display combined with touch sensor. In this disclosure, a separate waveguide in which infrared (IR) light propagates by TIR is placed over the display light guide, and throughout the surface of the display light guide, IR-sensing OLED elements are dispersed. Upon touching the waveguide, some light will be scattered downwards and detected by the underlying OLED sensor element. Since this solution requires IR sensors throughout the light guide, the light sensors may occupy a significant part of the display surface, hence affecting the imaging capability. The stacked solution also adds thickness to the design.

SUMMARY

It is an object of the invention to at least partly overcome one or more of the above-identified limitations of the prior art.

Another objective is to reduce the required thickness for providing touch sensitivity to a display device.

One or more of these objects, as well as further objects that may appear from the description below, are at least partly achieved by means of a touch-sensing display apparatus and an electronic device according to the independent claims, embodiments thereof being defined by the dependent claims.

A first aspect of the invention is a touch-sensing display panel, comprising a plurality of image-forming pixel elements; a planar light guide with a first refractive index, having a front surface forming a touch-sensing region and an opposite rear surface facing the pixel elements; a plurality of light emitters arranged at a peripheral region of the panel to emit light into the light guide for propagation therein through total internal reflection in at least the front surface; a plurality of light detectors disposed at the peripheral region for receiving light from the light guide; and an optical layer disposed at the rear surface of the light guide to cover a plurality of the image-forming pixel elements in at least a central region of the panel, wherein said optical layer is configured to reflect at least a part of the light from the emitters impinging thereon from within the light guide.

In one embodiment said optical layer has a second refractive index which is lower than the first refractive index.

In one embodiment an extension portion of the optical layer is disposed over the light emitters, said extension portion having a third refractive index which is higher than the second refractive index.

In one embodiment the third refractive index is equal to or higher than the first refractive index.

In one embodiment the extension portion of the optical layer covers said peripheral region.

In one embodiment the light emitters are coupled to emit light into the light guide, which light bypasses said main portion of the optical layer.

In one embodiment said light emitters and said image-forming pixel elements are OLED elements.

In one embodiment the light emitters are integrated with the image-forming pixel elements in the panel.

In one embodiment said light emitters are disposed behind one of the image-forming pixel elements, and configured to emit light through the image-forming pixel elements and into the light guide.

In one embodiment the extension portion of the optical layer is also disposed over the light detectors.

In one embodiment said light detectors are coupled to receive light from the light guide, which light bypasses said main portion of the optical layer.

In one embodiment said light detectors are OLED elements.

In one embodiment the light detectors are integrated with the image-forming pixel elements in the panel.

In one embodiment the light detectors are functionally arranged in a number of detector subsets, wherein the detectors of one subset are configured to operate as one larger area light detector.

In one embodiment said light detectors and said image-forming pixel elements are stacked OLEDs, wherein the light detectors are configured to detect light from the light guide through the image-forming pixel elements.

In one embodiment at least one of said light detectors is disposed behind a plurality of the image-forming pixel elements.

In one embodiment the touch-sensing display panel further comprises a light output mechanism arranged to lead out light from the light guide to the light detectors.

In one embodiment said light guide is a substrate of the panel on which said pixel elements are formed, and said light guide is sealed at an edge portion to a cover disposed on the opposing side of the pixel elements.

In one embodiment said pixel elements are formed on a substrate, which is sealed at an edge portion to a said light guide cover, which is disposed on the opposing side of the pixel elements.

In one embodiment said image forming pixel elements are configured to operate in the visible range, whereas the emitters and detectors are configured to operate in the IR range.

In one embodiment a grid of propagation paths is defined across the touch-sensing region between pairs of light emitters and light detectors.

In one embodiment the touch-sensing display panel comprises an LCD unit, of which a central region is controlled to operate as said image-forming pixels and a peripheral region is controlled to pass light from the light guide to the detectors.

In one embodiment the touch-sensing display panel comprises LCD unit including a backlight, wherein the LCD unit is controlled to emulate said emitters by passing light from the backlight through selected portions of the LCD unit.

According to a second aspect, the invention relates to an electronic device comprising the touch-sensing display panel of any preceding claim, and a controller for causing the image-forming elements to display information content within at least part of the touch surface while causing the touch-sensor elements to provide touch sensitivity within said at least part of the touch surface.

According to a third aspect, the invention relates to a method of producing a touch-sensing display panel, comprising the steps of:
providing a transparent substrate with a first refractive index;
providing an optical layer on a rear surface of the substrate, with a second refractive index which is lower than the first refractive index at a central region;
providing a matrix of pixels at the rear surface over the central region and over a peripheral region;
providing a cover sheet over the pixel matrix; and
sealing the cover sheet to the substrate.

According to a fourth aspect, the invention relates to a method of producing a touch-sensing display panel, comprising the steps of:
providing a carrier sheet;
providing a matrix of pixels on the carrier sheet;
providing a transparent substrate with a first refractive index over the pixels, with an intermediate optical layer with a second refractive index which is lower than the first refractive index at central region of the substrate within a peripheral region;
sealing the transparent substrate to the carrier sheet.

In one embodiment, the method comprises the steps of:
connecting a plurality of pixels in at least the central region to a control circuit configured to drive them to act as image-forming pixel elements;
connecting at least one pixel in the peripheral region to a control circuit configured to drive them to emit light into the transparent substrate for propagation by TIR therein; and
connecting at least one detector in the peripheral region to a control circuit configured to drive it to detect light from the transparent substrate, emanating from the emitter.

In one embodiment said pixels are OLEDs.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
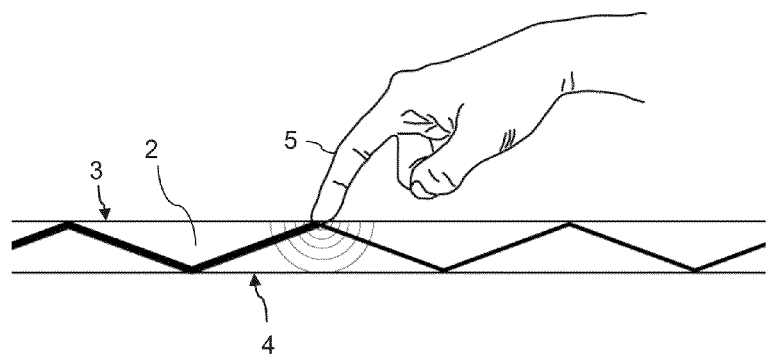
FIG. 1 is a side view of an object in contact with a light transmissive light guide to illustrated the use of FTIR for touch sensing.

The present invention relates to the use of optical techniques, specifically FTIR, for providing touch sensitivity to a display apparatus. More specifically, the invention provides a truly integrated touch-sensing display panel 1, operating by means of FTIR. Example embodiments are mainly presented in relation to OLED displays but also to LCD, and throughout the description the same reference numerals are used to identify corresponding elements.

FIG. 1 illustrates the operating principle of an touch-sensing FTIR system. In the side view of FIG. 1, a beam of light is propagated by total internal reflection (TIR) inside a planar (two-dimensional) light guide 2. The light guide 2 comprises opposing surfaces 3, 4 which define a respective boundary surface of the light guide 2. Each boundary surface 3, 4 reflects light that impinges on the boundary surface from within the light guide 2 at an angle that exceeds the so-called critical angle, as is well-known to the skilled person. When an object 5 is brought sufficiently close to one of the boundary surfaces (here, the top surface 3), part of the beam may be scattered by the object 5, part of the beam may be absorbed by the object 5, and part of the beam may continue to propagate in the light guide by TIR in the incoming direction. Thus, when the object 5 touches the top surface 3, which forms a "touch surface", the total internal reflection is frustrated and the energy of the transmitted light is decreased, as indicated by the thinned lines to the right of the object 5. This phenomenon is known as FTIR (Frustrated Total Internal Reflection) and a corresponding touch-sensing device may be referred to as an "FTIR system".

Although not shown in FIG. 1, the FTIR system typically includes an arrangement of emitters and detectors, which are distributed along the peripheral region of the touch surface 3. Light from an emitter is introduced into the light guide 2 and propagates by TIR to one or more detectors. Each pair of an emitter and a detector defines a "detection line", which corresponds to the propagation path from the emitter to the detector. Any object that touches the touch surface along the extent of the detection line will thus decrease or attenuate the amount of light received by the detector. The emitters and detectors are typically arranged to define a grid of intersecting detection lines on the touch surface, whereby each touching object is likely to cause an attenuation of several non-parallel detection lines.

The arrangement of detectors is electrically connected to a signal processor, which acquires and processes an output signal from the arrangement. The output signal is indicative of the power of transmitted light at each detector. The signal processor may be configured to process the output signal for extraction of touch data, such as a position (e.g. x, y coordinates), a shape or an area of each touching object.

While FIG. 1 illustrates the working principle of FTIR touch as such, the invention relates to a touch-sensing display panel in which an FTIR touch-sensing mechanism is truly integrated with a display, as will be shown with reference to the subsequent drawings.

Figure 2A:
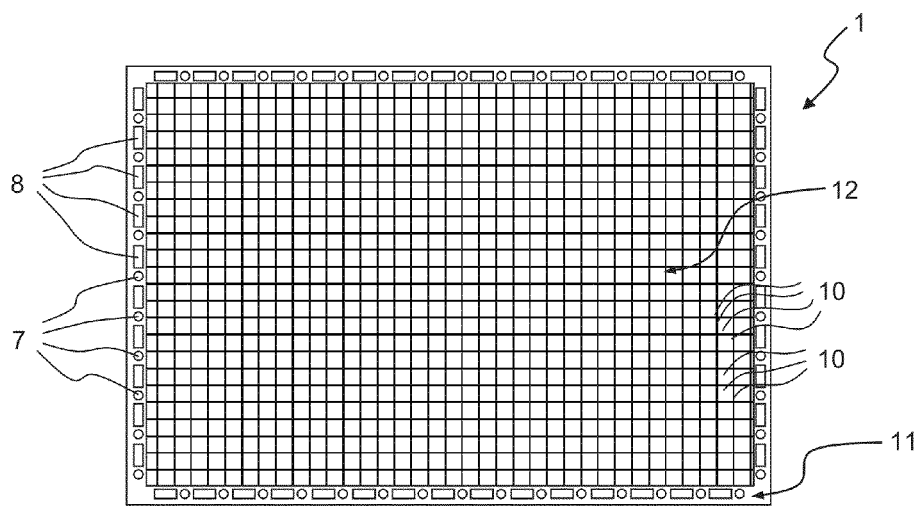
FIGS. 2A-2B show a top plan and a side view of an embodiment of the invention.
Figure 2B:
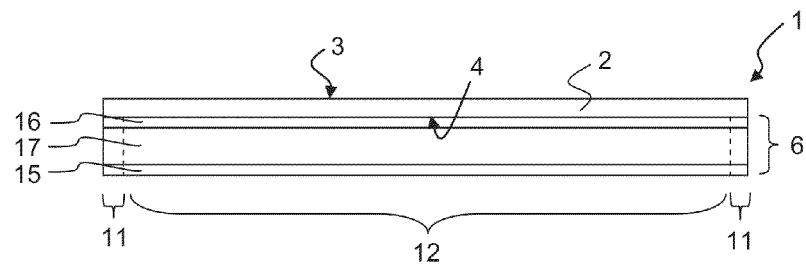

FIG. 2A is a top plan view and FIG. 2B is a side view of a touch-sensing display light guide 1 according to an embodiment of the invention. The touch-sensing display light guide 1 is implemented as a combination of a light transmissive light guide 2 that defines a front touch surface 3, and a dual-function display pixel matrix 6 which is configured to both display images through the front surface 3 and provide touch sensitivity to the front surface 3 via FTIR.

As seen in the plan view of FIG. 2A, a plurality of emitters 7 and detectors 8 (collectively referred to as "touch-sensor elements") are arranged in interleaved fashion underneath a peripheral region of the light guide 2. It should be noted, though, that interleaved arrangement is merely one example of positioning the emitters 7 and detectors. Another example may be to arrange emitters along two sides, and detectors along the other two sides, of the panel 1. In the drawings, for illustrative purposes only, emitters 7 and detectors 8 are represented by circles and rectangles, respectively. Furthermore, a center region of the light guide 2 is aligned with a matrix of image-forming elements or picture elements ("pixels" or "pixel elements") 10 that define a display area for displaying visual images in monochrome or color. The pixels 10, which are indicated as a matrix of square elements in FIG. 2A, may be formed by any available integrated display technology, including but not limited to OLED (Organic Light-Emitting Diode), PLED (Polymer Light-Emitting Diode), LED (Light Emitting Diode), LCD (Liquid Crystal Display) with internal illumination ("backlighting"), TFT-LCD (Thin Film Transistor Liquid Crystal Display), ELD (Electroluminescent Display), etc. Below, embodiments of the invention will be further exemplified mainly with respect to OLED, but also to LCD.

Embodiments of the invention are based on the insight that the emitters 7 and detectors 8 may be integrated into the display unit 6, and preferably be formed by the same technology as used for producing images in the display area. Furthermore, the transparent display cover, which covers the pixel elements, is also used as a light guide. As such, various embodiments of the invention may be realized with no addition of thickness or bulkiness at all. As used herein, an "integrated" emitter/detector 7, 8 is to be construed as an emitter/detector 7, 8 that is integrally formed on or in a substrate, which typically is a composite substrate comprising a plurality of layers. In FIG. 2B, the integration is indicated by dashed lines indicating that the display unit 6 is functionally (not physically) separated into a peripheral region 11 with emitters 7 and detectors 8 and a center region 12 with pixels 10, where the emitters 7, detectors 8 and pixels 10 are integrally formed in a common substrate. Each emitter 7 is configured to generate a cone of light in any suitable wavelength region. In one embodiment, the emitter 7 generates light that is invisible to the human eye, preferably in the infrared (IR) or possibly in the ultraviolet (UV) region. Each detector 8 is configured to be responsive to the light emitted by emitters 7.

Compared to the prior art as described in the background section, embodiments of the invention make is possible to provide touch sensitivity to a display apparatus essentially without adding to the thickness of the display apparatus. Furthermore, the manufacturing cost may be reduced since there is no need for a separate mounting operation for attaching emitters 7 and detectors 8. As will be further exemplified below, the emitters/detectors 7, 8 may be formed from functional structures also present in the display unit for the operation of the pixels 10. This means that the emitters 7 and detectors 8 may be manufactured by the same or a similar process as the pixels 10, whereby the added manufacturing cost may be minimal. It is also to be noted that the number of emitters 7 and detectors 8 that need to be added is comparatively small compared to the number of pixels of a typical display apparatus. For example, a 3.5" display may be provided with about $10\text{-}10^2$ emitters and detectors, while the number of pixels is typically in the order of about $10^5\text{-}10^6$. Still further, the touch sensitivity may be added without impairing the quality of images displayed in the display area, since the need to add touch-sensing layer(s) to the display area or integrate light detectors among the pixels within the display area is obviated.

Furthermore, by integrating the emitters/detectors 7, 8 at the peripheral region 11 of the display unit 6, it is possible to omit separate contacting of the emitters/detectors 7, 8. Instead, they may be contacted and electronically controlled in the same way as the pixels 10. For example, a data bus structure or an electronics backplane for supplying control signals to the pixels 10, to selectively control the light emitted by the pixels 10, may also be used to supply control signals to the individual emitters 7 and detectors 8 and/or to retrieve output signals from the individual detectors 8.

FIG. 2A indicates that the peripheral region 11 contains only emitters 7 and detectors 8, and thus is free of pixels 10. However, it is certainly possible to include pixels 10 also in the peripheral region 11, if desired, as will be described further below.

Figure 3:
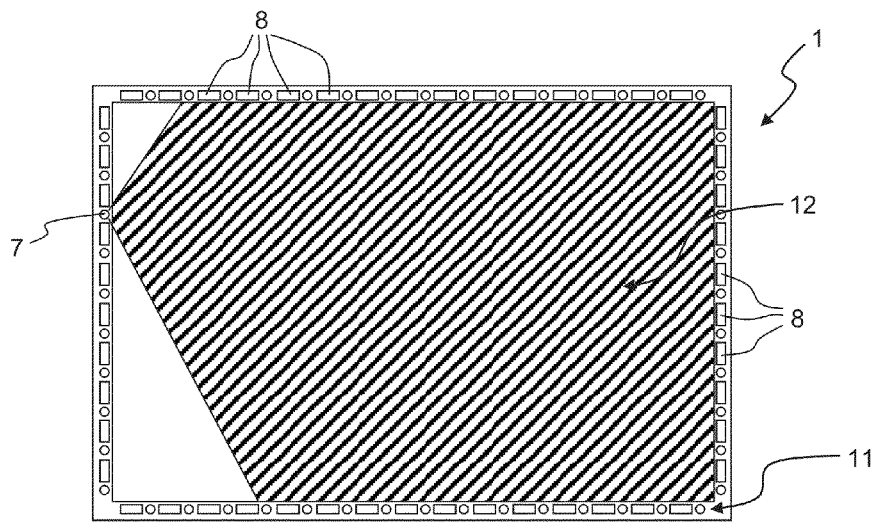
FIG. 3 is a top plan view of an embodiment with one activated emitter.

FIG. 3 is a top plan view to further illustrate the operation of the touch-sensing display light guide 1. For reasons of clarity, the pixels have been omitted. As shown, one emitter 7 is activated to emit an expanding beam of light. The emitted beam, or at least part thereof, is coupled into the light guide 2 such that it propagates by TIR across the touch surface 3, while expanding in the plane of the light guide 2 away from the emitter 7 (indicated by the hatched area). Such a beam is denoted a "fan beam" herein. Thus, each fan beam diverges from an entry or incoupling site, as seen on a top plan view. Downstream of the touch surface 3, the propagating light is coupled out of the light guide 2 and received by a subset of the detectors 8. As noted above, a detection line is formed between the emitter 7 and each of the detectors 8 that receive the fan beam. It is realized that a large number of detection lines may be generated by activating each of the emitters 7 and measuring the power of received light at the detectors 8 for each emitter 7. Depending on implementation, the emitters 7 may be activated in sequence or concurrently, e.g. by implementing the coding scheme disclosed in WO2010/064983.

Reverting to FIGS. 2A-2B, the display pixel matrix 6 may be an optoelectronic device that makes use of organic materials for defining the pixels 10, emitters 7 and detectors 8. Examples of organic optoelectronic devices include organic light emitting devices (OLEDs), organic phototransistors, organic photovoltaic cells, and organic photodetectors. For further details regarding the structure and manufacture of organic optoelectronic devices, reference is made to WO2011/068761 and citations therein, all of which are incorporated herein by reference.

In the following, it is assumed that the display pixel matrix 6 in FIGS. 2A-2B is based on OLEDs. The display device 6 comprises a rear electrode (e.g. an anode) 15, and a front electrode (e.g. a cathode) 16, and an intermediate organic structure 17, which may be formed by one or plural organic layers, as is known in the art. The front electrode layer 16 is transparent and may e.g. be made of indium tin oxide (ITO). The pixels 10 of the display area may be defined by patterning of the electrode layers 15, 16, and optionally by patterning of the organic structure 17. Each pixel 10 may include one or more sub-pixels (not shown), which may be formed by selective doping to generate different light emissive properties of the different sub-pixels, e.g. such that the sub-pixels emit red, green and blue light, respectively. Different designs of a combined thin film transistor (TFT) structure and OLED pixels are shown in US20080150848, which is incorporated herein by reference.

The emitters 7 and detectors 8 in the peripheral region 11 may also be defined by patterning of the electrode layers 15, 16 and/or by patterning of the organic structure 17. It is well-known that junction diodes, such as LEDs and OLEDs, are operable as both emitters and detectors by application of proper control voltages to the junction diodes. Thus, the emitters 7 and the detectors 8 may be implemented by the same or similar elements, whereby the emitters 7, the detectors 8 and the pixels 10 are formed as portions in the organic structure 17 that are selectively and individually addressable via the electrode layers 15, 16. In this embodiment, the combination of electrode layers 15, 16 and organic structure thus forms a composite substrate in which emitters 7, detectors 8 and pixels 10 are integrated.

Preferably, the light guide 2 is included as a transparent substrate during manufacture of the display pixel matrix 6, e.g. as a backing for supporting the front electrode 16. Alternatively, the OLEDs may be built up from the side of the lower electrode layer 15, and in that case the light guide 2 is a cover sheet that is nevertheless required for an OLED display, due to its sensitivity to moisture. Generally, the light guide 2 may be made of any material that transmits a sufficient amount of radiation in the relevant wavelength range to permit a sensible measurement of transmitted energy. Such material includes glass, poly(methyl methacrylate) (PMMA), polycarbonates (PC), PET (poly(ethylene terephthalate)) and TAC (Triallyl cyanurate). The light guide 2 may be flat or curved and may be of any shape, such as circular, elliptical or polygonal. It is possible that the light guide 2 is comprised of plural material layers, e.g. for the purpose of scratch-resistance, anti-fingerprint functionality, anti reflection or other functional purpose.

The use of OLED technology makes it possible to design the display unit 6 as a thin and flexible unit, if desired. It is also possible to design the emitters 7 and the pixels 10 with different emissive properties, if desired. For example, the wavelength(s) at which the organic structure 17 emits light may be readily tuned with appropriate dopants during manufacture. Furthermore, the display unit 6 does not need to have a backlight. Still further, the size and shape of the image-forming pixels 10, emitters 7 and detectors 8 are readily set in manufacture. It may e.g. be advantageous to make the emitters 7 and detectors 8 larger than the pixels 10. The amount of light emitted by an OLED element increases with its surface area, and it may thus be desirable to make the emitters 7 larger than the pixels 10 to increase the amount of emitted light from each emitter 7. OLEDs are known to have small heat losses, which enables the use of large emitters 7 without a need for additional cooling measures. The detectors 8 may also be made larger than the pixels 10 in order to improve the light gathering ability of the detectors 8. Another advantage of OLED technology is that OLEDs typically have a large index of refraction, typically in the range of 1.7-2 or even higher, whereby light is emitted in a large solid angle, which may serve to favorably increase the divergence angle of the respective fan beam inside the light guide 2 (cf. FIG. 3).

Figure 4:
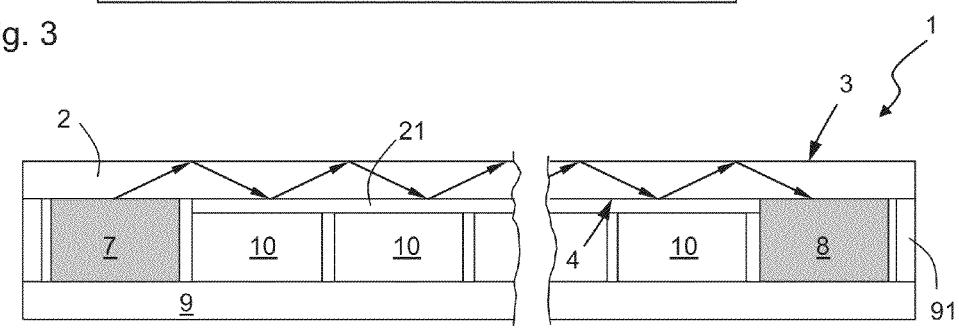
FIG. 4 is a side section view of an embodiment including an OLED display unit.

As noted above, it is conceivable that the light guide 2 is formed by a transparent substrate or backing for the front electrode layer 16. It is realized that the process for manufacturing the display unit 6 may be adapted to add a layer of lower index of refraction between the electrode layer 16 and the transparent backing, i.e. the light guide 2, if needed to sustain light propagation by TIR therein. FIG. 4 shows an embodiment of the invention, wherein a cross-section of a touch-sensing display panel 1 is disclosed. In this drawing, the layering of the electrodes and the organic structure outlined with respect to FIG. 2B are not shown in detail. However, separate pixel elements 10 are indicated at the central region of the panel. As is well known in the art, each pixel 10 may be configured to emit light in one color only, or may comprise several sub pixels configured to emit light in different colors, such as RGB (red, green, blue). Such sub pixels may be formed by stacking OLEDs, i.e. forming them on top of each other, or by placing them next to each other within the area of the pixel element 10. So, each pixel 10 may include one or several OLEDs. At the peripheral region the emitters 7 and detectors 8 are arranged, one of each shown in the drawing. Preferably, as already described, also the emitter 7 and detector 8 are OLEDs, formed integrally with the image-forming pixels 10. However, the purposive use of the emitter 7 and detector 8 on the one hand, and the image-forming pixel elements 10 on the other hand, are quite different. The image-forming pixels 10, i.e. the display pixels, are configured to shine light out from the display panel 1, preferably in a wide cone angle but most importantly straight up (in the drawing), which would normally represent the best viewing angle for an observer. The emitter 7, however, will only be useful if its light is captured within the light guide 2 to propagate with TIR towards the detector 8. As a consequence, the part of the light emanating from the emitter 7 that goes straight up will be lost. However, a good part of the light will impinge on the front surface 3, from the inside of the light guide 2, in a wide enough angle to be deflected by TIR. The problem is that since the refractive index of the image-forming pixels 10 normally is higher than the index of the light guide 2, the light would escape downwards through the pixels 10 after reflection in the front surface 3. For this purpose, an optical layer 21 is disposed between the rear surface 4 of the light guide 2 and the image-forming pixels 10. In one embodiment this optical layer 21 is made from a material which has a refractive index $n_1$ which is lower than the refractive index $n_0$ of the light guide 2. That way, there will be TIR in the light guide 2 in both the front surface 3 and the rear surface 4, as indicated by the arrows, provided that the angle of incidence is wide enough. As an example, the optical layer 21 may be provided by means of a resin used as a cladding material for optical fibers. Such a resin lay may be provided on the substrate 2 before deposition of the electrode and organic layers. Alternatively, if the OLED structure is built from a bottom sheet or plate 9, the optical layer 21 may be provided on the lower face 4 of the light guide 2 before attachment over the OLEDs, or over the OLEDs before attachment of the light guide 2. Another example of an optical layer 21 with a lower refractive index is an air gap 21, as will be described further below with reference to FIG. 15.

In another embodiment, the optical layer 21 is a wavelength-dependent reflector. Particularly, reflection of the emitter light in the rear surface 4 is obtained by providing an optical layer 21 which is at least partly reflective for the emitter light, while at the same time being highly transmissive for visible light. As an example, such an optical layer 21 may be provided by means of a commercially available coating called IR Blocker 90 by JDSU. This coating 21 has a reflectivity of up to 90% in the NIR, while at the same time being designed to minimize the effect on light in the visible (VIS) range to not degrade the display performance of the touch system, and offers a transmission of more than 95% in the VIS. It should be noted that there are also other usable available types of coatings, IR Blocker 90 being mentioned merely as an example. This type of wavelength-dependent reflectors are typically formed by means of multi-layer coatings, as is well known in the art. In an embodiment of this kind, light from the emitters 7 will propagate by TIR in the front surface 3 and by partial specular reflection in the rear surface 4.

As is well known, OLEDs are sensitive to moisture, and the organic layers must therefore be encapsulated. Apart from the light guide 2 and the bottom sheet 9, a hermetic peripheral seal 91 is therefore also provided on the panel, e.g. by means of a UV-curable epoxy.

It should be noted that the drawings here do not represent any realistic scale. The thickness of the light guide front glass 2 may be dependent on the size of the panel 1 and what it intended to be used for, i.e. the environment it will be used in. However, an OLED structure as such, with electrode layers and intermediate organic layers, may be very thin and even less than 1 μm. The substrate 2 or 9 and the cover 9 or 2 will add to the thickness considerably, though, in order to provide rigidity to a certain extent. In one embodiment, the light guide may be in the order of 200-500 μm thick. The optical layer 21, though, need not be thicker than 1-5 μm to provide the cladding effect of realizing TIR in the rear surface 4 of the light guide 2.

Figure 5:
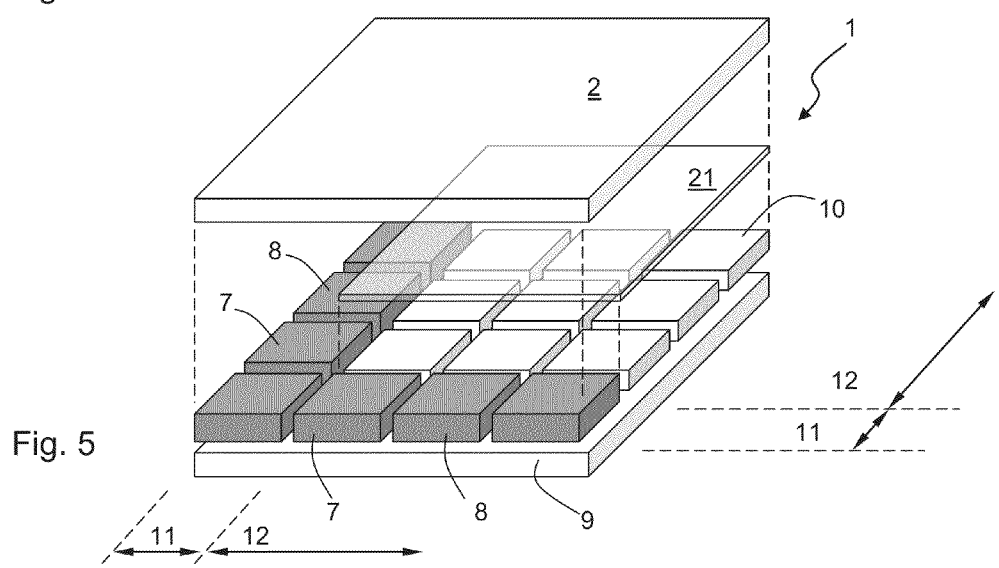
FIG. 5 is a perspective view of a cutout corner portion of an embodiment of FIG. 4

FIG. 5 shows quite schematically a corner portion of a touch-sensing display panel 1 according to an embodiment of the invention. For the sake of simplicity, the peripheral seal 91 is left out in this drawing. The lower left corner in the drawing represents an outer corner of the panel 1, whereas the right and upper edges are to be understood as cutout from a larger panel 1. Emitters 7 and detectors 8, shown in grey, are arranged along the peripheral region 11, and the optical layer 21 is provided to cover the central region 12 of the panel 1 and the image-forming pixels 10 arranged at the central region 12. In an alternative embodiment (as can be seen in FIG. 8), image-forming pixels 10 are also present in the peripheral region 11 among the emitters 7 and detectors 8. Also, the peripheral region 11 may comprise more than one row of pixels. In addition, the optical layer 21 may cover also such image-forming pixel elements 10 provided in the peripheral region 11, in addition to covering the central region 12. It should be understood that FIG. 5 (and FIG. 7) only schematically show the different elements in a separated manner in order to clearly point out those elements, it shall not to be understood as an assembly instruction or the like.

Figure 6:
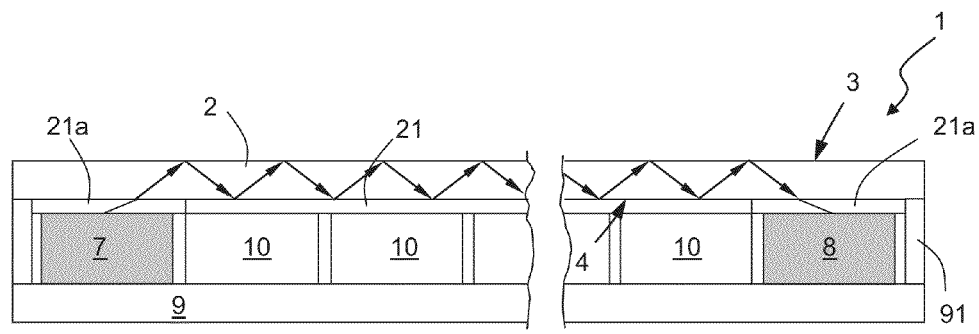
FIG. 6 is a side section view of variant of the embodiment of FIG. 4.
Figure 7:
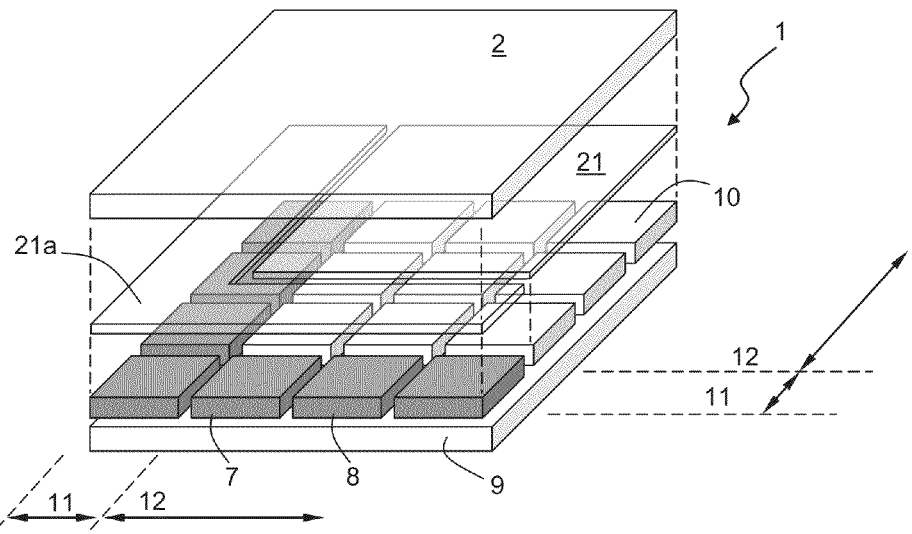
FIG. 7 is a perspective view of a cutout corner portion of an embodiment of FIG. 6
Figure 8:
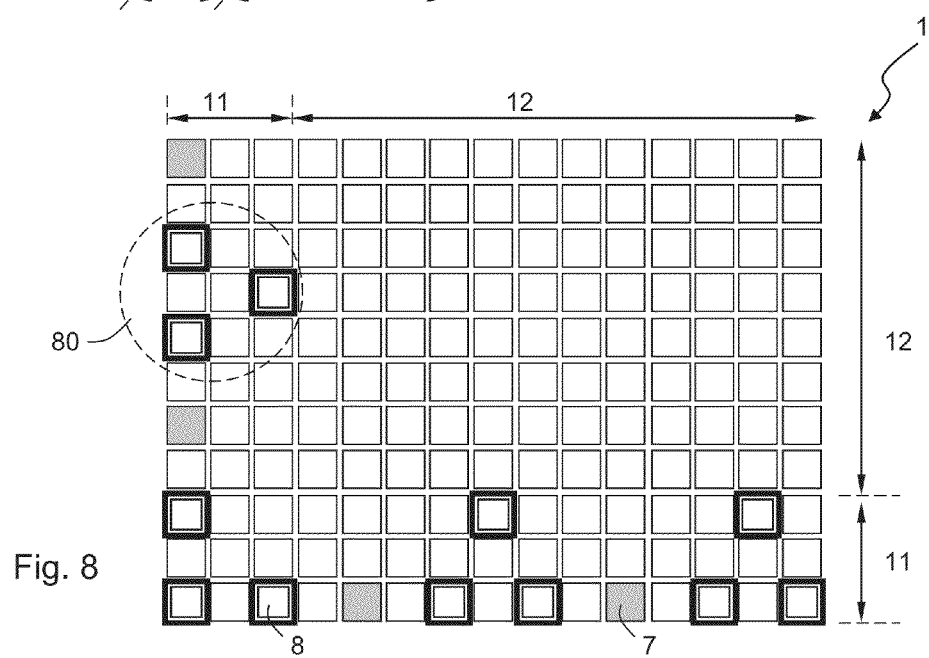
FIG. 8 is a top plan view of an embodiment with plural grouped detectors.

FIGS. 6 and 7 show an alternative embodiment, in which an extension portion 21a of the optical layer 21 is provided over the emitters 7 and detectors 8. The extension portion 21a preferably has substantially the same thickness as the optical layer 21, which will make it easier to make produce the OLEDs in the peripheral region 11 and in the central region 12 in the same process, since they will be provided at the same level. This extension portion 21a has a refractive index $n_2$ which is higher than the refractive index $n_1$ of the optical layer 21. This way, light that is injected into the light guide 2 through the extension portion 21a may still be reflected in the rear surface 4 where it faces the optical layer 21, provided that the angle of incidence is large enough. The refractive index $n_2$ of the extension portion 21a may e.g. be the same as the refractive index $n_0$ for the light guide 2. Alternatively, a material for the extension portion 21a may be chosen such that its refractive index lies between the refractive index for the light guide 2 and the refractive index for the emitter 7 and/or the detector 8.

In the embodiment shown in FIG. 7, which also shows a cutout lower left corner portion of a panel 1, the extension portion 21a runs as a frame portion covering the entire peripheral region. As an alternative, where image-forming pixels 10 are disposed also in the peripheral region, the optical layer 21 may be disposed over such image-forming pixel elements in the peripheral region too.

FIG. 8 schematically shows a top view of a lower left cutout corner portion of a panel 1 in accordance with an embodiment of the invention. In this embodiment, emitters 7, preferably OLEDs, are shown in grey and are located in the peripheral region 11. Detectors 8, preferably also realized by means of OLEDs, are marked with a double frame. The optical layer 21 is not included in the drawing, but shall be understood to cover at least all of the image forming elements 10 in the central region 12, and possibly also some or all of the image forming elements 10 in the peripheral region 11. If devised in accordance with the embodiment described with reference to FIGS. 6 and 7, an extension portion 21a is also employed to cover the emitters 7 and the detectors 8. FIG. 8 also illustrates how several detectors 8 can be functionally grouped (in the drawing also physically grouped) into a subset 80 to act as one larger detector. This way the light-sensing detector surface can be increased, and be operated as having its center between the detectors 8 of the subset 80. FIG. 8 also shows that the peripheral region 11, in some embodiments, may include more than one row of pixels.

Figure 9:
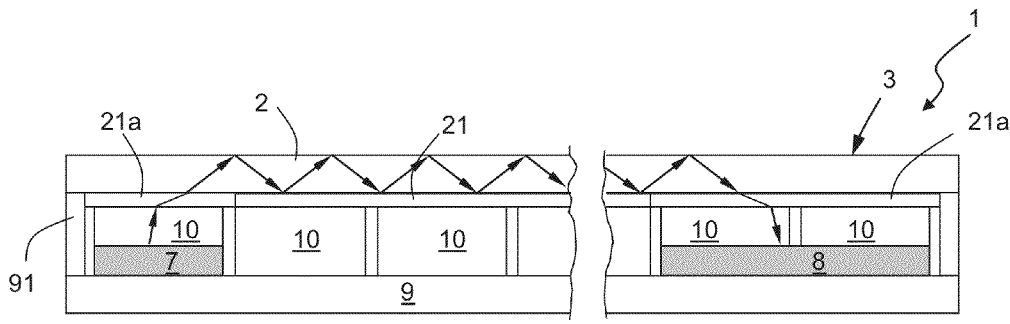
FIGS. 9-10 are a side section views of other variants of the embodiment of FIG. 4.

FIG. 9 illustrates a variant of the embodiment of FIG. 6. However, instead of arranging the emitters 7 and detectors 8 to take the place of respective image-forming elements 10, they are instead configured together as stacked OLEDs. Also, as illustrated, the detector 8 may be realized as one larger surface OLED 8, or as a grouped subset 80 of separate adjacent or dispersed OLED detectors 8, each stacked with an image-forming element 10. The drawing shows the emitter 7 and detector 8 stacked beneath a respective image-forming OLED element 10. In an alternative design, the emitter 7 and/or the detector 8 may instead by stacked on top of the respective image-forming OLED element 10.

Figure 10:
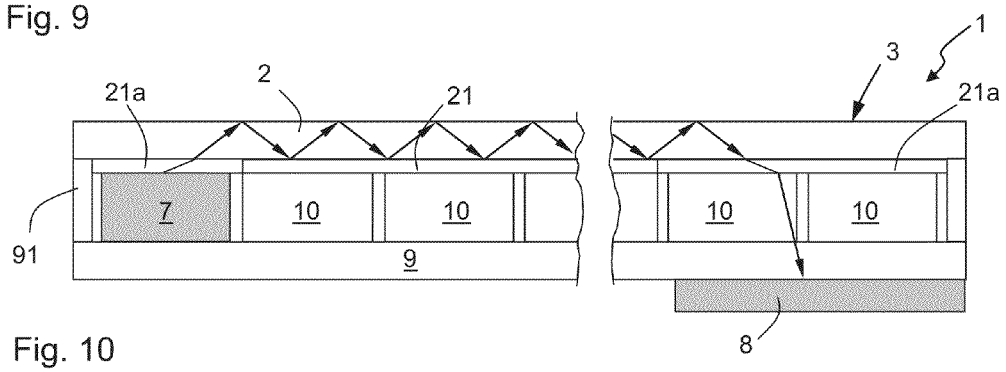

FIG. 10 shows an embodiment, which exhibits yet another type of detector arrangement. In this embodiment, the detector 8 is provided as a separate element, attached beneath the entire OLED structure of image-forming elements 10. Such a design has a large degree of freedom for the placement and size of the detector element 8, but requires that also the back panel 9 is transmissive to the operating wavelength range of the emitter 7, which typically lies in the near IR (NIR). In FIG. 10 this detector design is combined with an integrated OLED emitter 7, corresponding to the disclosure of FIG. 6. However, a stacked OLED emitter 7, as in FIG. 9, may also be employed.

Figure 11:
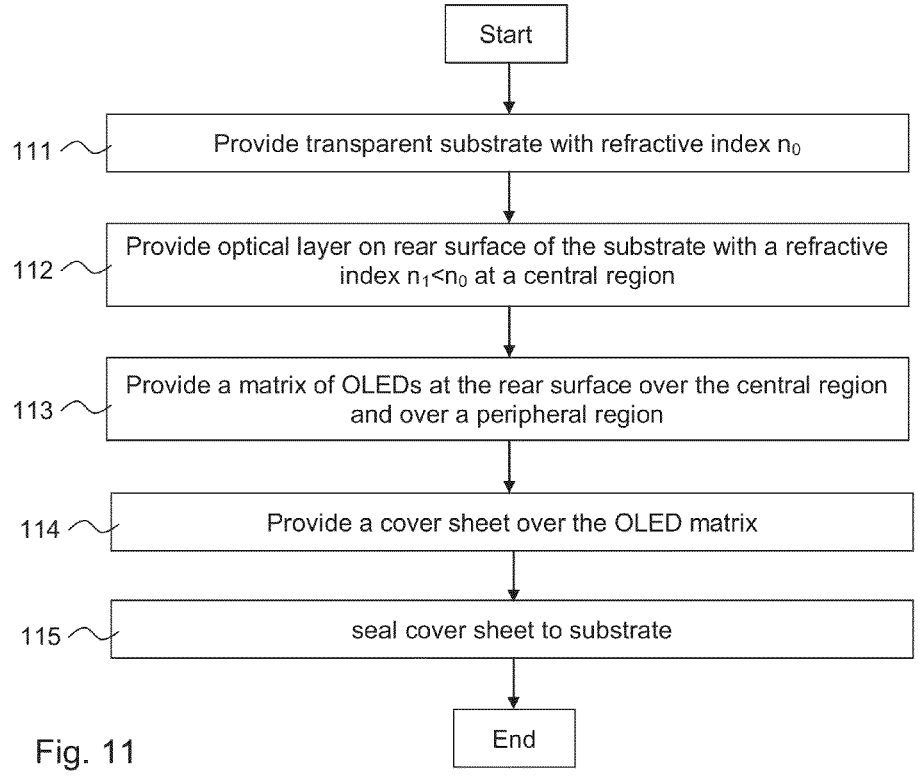
FIGS. 11-12 are flow charts of two embodiments of methods for providing a touch-sensing display panel.
Figure 12:
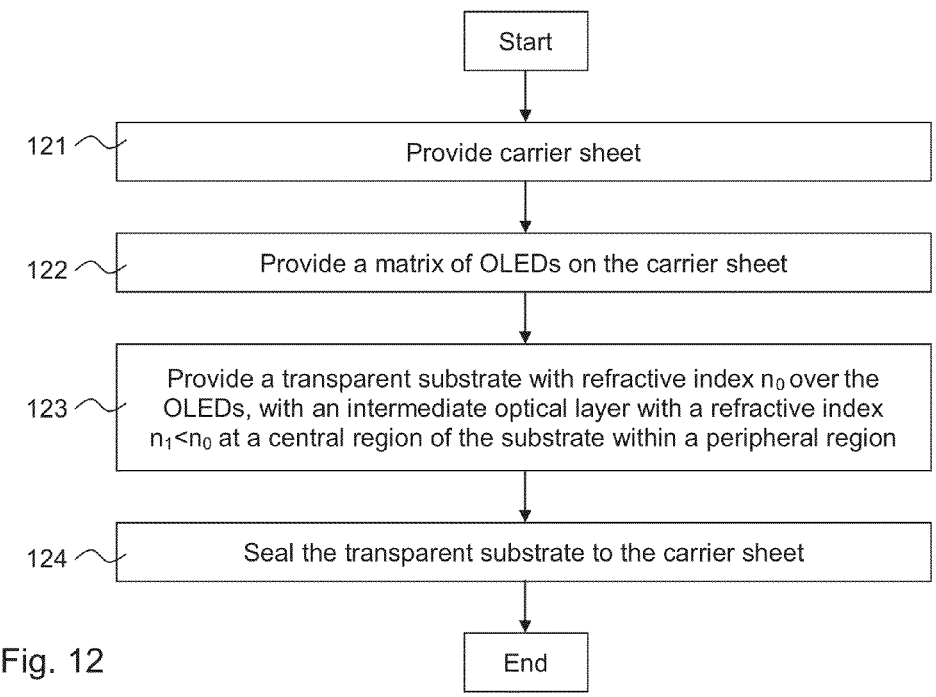

FIGS. 11-12 outline some steps included in embodiments of a method of producing a touch-sensing display panel 1 in accordance with the invention. FIG. 11 relates to a method of producing a pixel matrix that starts from anode side, and FIG. 12 relates to a method of producing a pixel matrix starting at a cathode side, according to known alternative principles within the industry. In a preferred embodiment, those pixels are OLEDs.

Following the embodiment of FIG. 11, step 111 involves providing a transparent substrate 2 with refractive index $n_0$. This transparent substrate 2 will serve as the FTIR light guide in the final product, with a front surface 3 providing the touch-sensitive region, potentially with additional functional layers on it. The substrate 2 may e.g. be made of a suitable glass material, of PMMA, PC, or other transparent material.

In a subsequent step 112, an optical layer 21 is provided on a rear surface 4 of the substrate with a refractive index $n_1 < n_0$ at a central region 12. The optical layer 21 may e.g. be a resin or an adhesive attached to the rear surface 4. Alternatively, the optical layer 21 may be formed in e.g. a vapor deposition process. The difference in refractive index need not be large. As a mere example, $n_0$ may be between 1.5 and 1.6, and $n_1$ may be between 1.4 and 1.5. With reference to the preceding disclosure, the optical layer 21 may be added with an extension portion 21a at a peripheral region 11 around the central region 12. In such an embodiment, the refractive index $n_2$ of the extension portion shall be higher than $n_1$.

In a subsequent step 113 a matrix of pixel elements is provided at the rear surface 4 over the central region 12 and over a peripheral region 11. According to processes well known in the art of OLED technology, such a process may include a TFT layer and possibly a TFT passivation layer thereon, before applying an anode layer. One or plural organic layers are then built up, typically including an emissive layer but selectively also transport layers and blocking layers. A cathode layer is then provided to create the polarity of the OLED cell.

In step 114 a cover sheet 9 is provided over the pixel matrix. This may be realized by means of an assembly of a rigid or flexible solid sheet 9, by coating the pixel matrix with a curable liquid, or in a vapor deposition process.

In step 115, the cover sheet 9 is sealed to the substrate 2, so as to obtain a hermetic encapsulation. This sealing is made using a peripheral seal 91, while still providing means for a galvanic connection to the pixel matrix, e.g. by means of a flex film connection. It should be noted that the steps of providing the cover sheet 9 and sealing it may at least to some extent be performed concurrently with each other.

The embodiment of FIG. 12 begins at the other end, with the step 121 of providing a carrier sheet 9. This carrier sheet will form the backside of the touch-sensing display panel 1, and while it therefore does not need not be transparent it may still be made of glass, a plastic material, a metal such as aluminum, etc.

Step 122 includes providing a matrix of pixels on the carrier sheet 9. This will be a process which has a reversed order in comparison with the process of FIG. 11, beginning with the cathode layer. Otherwise it may include the same type of electrode layers and organic layers, as is known in the art.

In step 123, a transparent substrate 2 with refractive index $n_0$ over the pixels is then provided, which has an intermediate optical layer 21 with a refractive index $n_1 < n_0$ at a central region 12 of the substrate within a peripheral region 11. As outlined above, the optical layer 21 may be applied to the backside 4 of the substrate 2 and then attached over the pixels. Alternatively, the optical layer 21 may first be coated onto the pixel matrix, after which the substrate 2 is attached. Also, as noted with reference to FIG. 11, an extension portion 21a may be provided over the peripheral region 11, adjacent to the optical layer 21.

In step 124, the transparent substrate is sealed to the carrier sheet. As for the embodiment of FIG. 11, this will include a peripheral seal and the provision of a connector to the electrode layers for driving of the pixel matrix. Again, the steps of providing the substrate 2 and sealing it may at least to some extent be performed concurrently with each other.

The process step of FIGS. 11 and 12, respectively, deal with the provision of the layered structure according to the invention. In order to become a final working product, the layered structure must also be connected and driven so as to enable the use of the panel 1 both for image reproduction and touch-sensing.

Figure 13:
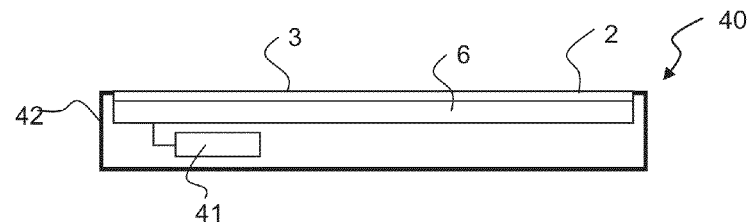
FIG. 13 is a section view of a touch-sensing display apparatus according to an embodiment.

FIG. 13 is a section view of a touch-sensing display apparatus 40, which comprises the display panel 1, including the light transmissive light guide 2 and a pixel matrix 6, and a signal processor 41, which are arranged in an enclosure 42 such that the light guide 2 forms a transparent front cover of the display apparatus 40. The signal processor 41 is a processing element (or means) which is connected to the display panel 1 so as to transmit control signals to the pixels, the emitters and the detectors, as well as to acquire output signals from the detectors. The signal processor 41 is also operable to generate and output touch data calculated based on the output signals. It is to be understood that the signal processor 41 may alternatively be implemented as a dedicated controller for the pixels and a dedicated controller for the emitters and the detectors.

It is to be understood that the display apparatus/display unity may form part of any form of electronic device, including but not limited to a laptop computer, an all-in-one computer, a handheld computer, a mobile terminal, a gaming console, a television set, etc. Such an electronic device typically includes a processor or similar controller that may be connected to control the display panel 1 to display information content within at least part of the touch surface 3 and to provide touch sensitivity within the touch surface 3. The controller may be implemented to control the display panel 1 via the signal processor 41, or it may implement part or all of the functionality of the signal processor 41.

Figure 14:
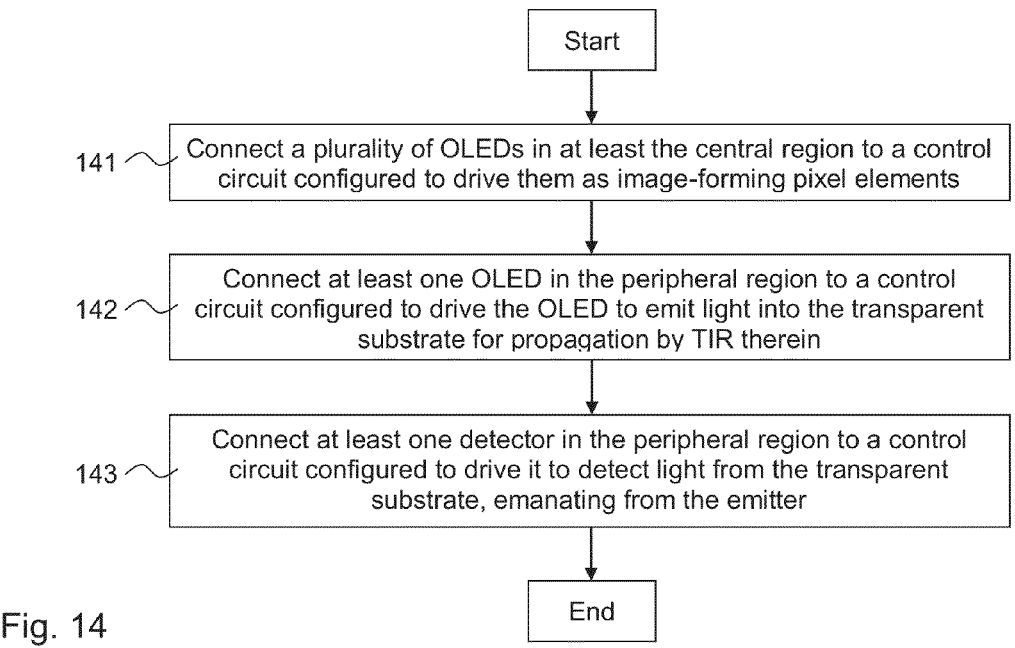
FIG. 14 is a flow chart of an additional method to the methods of FIGS. 11-12.

FIG. 14 shows a number of steps, which need not be provided in the given order, that may be included in any one of the embodiments of FIGS. 11 and 12, so as to create a functional connection of the display panel 1 to a signal processor 41.

In step 141 a plurality of pixels 10 in at least the central region 12 are connected to a control circuit 41 configured to drive them as image-forming pixel elements. As noted before, these image-forming elements are preferably all disposed under the optical layer 21, and may to some extent also be provided in the peripheral region 11. Collectively, the image-forming elements 10 form the display part of the panel 1.

In step 142 at least one pixel 7 in the peripheral region 11 is connected to a control circuit 41 configured to drive the pixel 7 to emit light into the transparent substrate 2 for propagation by TIR therein. Preferably, a number of emitters 7 are connected this way, provided in the peripheral region along at least two sides of the panel 1.

In step 143 at least one detector 8 in the peripheral region 11 is connected to a control circuit 41 configured to drive that detector 8 to detect light from the transparent substrate 2, emanating from the emitter 7. Correspondingly, a number of detectors 8 are preferably connected this way, provided in the peripheral region along at least two sides of the panel 1. Together with the emitters 7, they will form the touch-sensing detection grid of the touch surface 3. With reference to the embodiments of e.g. FIGS. 4 and 9-11, the detectors 8 may also be pixels 8 of a common matrix as the image-forming elements 10 and the emitters 7, preferably OLEDs, or alternatively separate detector elements 8 applied below the pixel matrix. Also, the detectors 8 may be connected to the control circuit 41 so as to be controlled in subsets 80, where each subset 80 has an aggregate detector surface of the combined surface areas of the included detectors 8.

Figure 15:
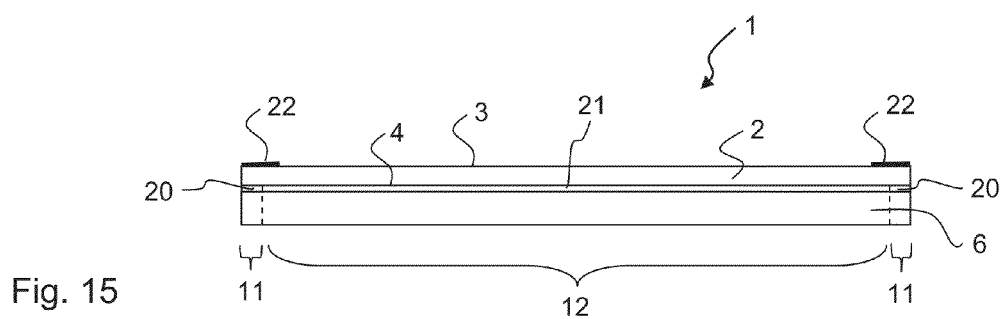
FIG. 15 is a section view of another embodiment of the invention.

Reference will now be made to the embodiment of FIG. 15, illustrating a side view of an FTIR system of a combined display and touch-sensing panel 1, formed by attaching a light guide 2 to a display 6. The light guide 2 may be bonded to the display unit 6 by means of an adhesive, such as an optical adhesive. In one embodiment, the light guide 2 is laminated onto the display unit 6. To enable the light from the emitters 7 to be coupled into and out of the light guide 2 at the peripheral region 11, while enabling the light to propagate by TIR across the light guide above the center region 12, different adhesives may be used in the peripheral region 11 and the center region 12, as indicated by reference numerals 20, 21. Specifically, the adhesive 21 in the center region 12 may be selected to have an lower index of refraction lower than the light guide 2, while the adhesive 20 in the peripheral region 11 may be selected to have an index of refraction that is higher or substantially equal to the index of refraction of the light guide 2.

In a variant, the light guide 2 is attached by an adhesive 20 to the display unit 6 at the peripheral region 11 only and arranged with an air gap 21 to the center region 12 of the display unit 6. It is currently believed that an air gap of at least about 2-3 μm is sufficient to enable propagation by TIR in the light guide 2. This variant may facilitate removal and replacement of the light guide 2 in the course of service and maintenance.

It is also conceivable that the light guide 2 is attached to the display unit 6 via a spacer 20 of solid transmissive material. The spacer may be bonded to the light guide 2 and the display unit 6, respectively, by thin adhesive layers, such that the coupling of light is controlled by the index of refraction of the spacer 20 rather than the adhesive. In analogy with the above, the spacer 20 may be located at the peripheral region 11 only, or spacers 20, 21 with different index of refraction may be located at both the peripheral region 11 and the center region 12.

The combined touch-sensing display panel FTIR system 1 may also include structures configured to re-direct the light emitted by the emitters 7, e.g. to reshape the emitted cone of light so as to increase the amount of light coupled into the light guide 2 in a desired fashion. For example, the emitted light may be redirected so as to form the fan beam in the plane of the light guide 2, as shown in FIG. 3, and/or the emitted light may be redirected to increase the amount of light that is trapped by TIR in the light guide 2. These light-directing structures may be included in the above-mentioned spacer 20, or the portion of the surface 4 that faces the peripheral region 11 of the display unit 6, or the peripheral region 11 of the display unit 6 itself. Similar light-directing structures may be included between the light guide 2 and the detectors 8, so as to re-direct outcoupled light onto the detectors 8. Generally, the light-directing structures may be said to define the field of view of the emitter/detector 7, 8 inside the light guide 2. The light-directing structures may be in the form of a micro-structured elements, such as but not limited to, reflectors, prisms, gratings or holographic structures. The micro-structured elements may be etched, printed, hot embossed, injection molded, pressure molded or otherwise provided between the emitters/detectors 7, 8 and the light guide 2. One approach for coupling the LEDs to the light guide panel is proposed in the article "Injecting Light of High-Power LEDs into Thin Light Guides", by Cornelissen et al, published in Proc. SPIE 7652, International Optical Design Conference 2010, pp 7652121-7652126, 2010. According to this approach, the top surface of the LED is modified to have a rough surface behaving like a Lambertian reflector. A dielectric multilayer filter is deposited on the bottom of the light guide panel, and the top surface of the LED is optically coupled to the filter by a silicone adhesive. The filter is optimized to only transmit light emitted from the LED at angles larger than the critical angle at the interface between the light guide and its neighboring optical layer. The purpose of the multilayer is thus to only transmit light that can propagate in the light guide. The light emitted at smaller angles is reflected back toward the rough LED surface where it is subsequently recycled by reflection and redistribution.

The light-directing structures may be omitted, whereby part of the emitted light will pass through the light guide 2 without being trapped by TIR. Selected parts of the front surface 3 of the light guide 2, e.g. above the peripheral region 11, may be provided with a coating or cover 22, as will be described in more detail below, to prevent such light from passing the front surface 3.

With or without light-directing structures, it may be desirable to implement stray light reduction measures. In one example, the edge surface of the light guide 2 and/or the portion of the surface 3 above the peripheral region 11 may be provided with surface structures that prevent light from the emitters from being reflected back into the light guide 2. Useful anti-reflective surface structures include diffusers and light-absorbing coatings.

In a variant, surface structures are provided on the edge surface of the light guide 2 and/or the portion of the surface 3 above the peripheral region 11 to re-direct light from the emitters into the light guide 2 for propagation by TIR. It is also possible that the edge surface is formed with a suitable bevel to re-direct the light. Such surface structures may include light-reflective coating(s) and/or micro-structured elements, and may implement or be part of the above-mentioned light-directing structures.

FIG. 15 further illustrates a cover frame 22, a feature which may be included in any one of the other described embodiments as well. The cover frame 22 is disposed to cover the peripheral region 11, and possibly also extend a portion into the central region 12. The cover frame 22 may fulfill one or more of three different purposes.

As noted above, a surface of the cover frame 22, facing the light guide 2, may be configured to reflect light from the emitter 7 such that it may propagate in the light guide 2 rather than escape. As an example, a diffuser may be used for this purpose, which will reflect a part of the emitter light in angle that may satisfy the requirements for TIR in the light guide 2.

Secondly, the cover frame 22 may hide any structures in the peripheral region 11 from a user, particularly if only the central region 12 is used as an image display. For this purpose the cover frame 22 should be opaque to visible light.

As a third purpose, the cover frame 22 may be configured to block out ambient light from reaching the detectors 8. For this purpose, the cover frame 22 should be opaque to the operating wavelength of the touch-sensing system, i.e. the light detected by the detectors 8 from the emitters 7 to determine the occurrence of a touch. As mentioned, also the FTIR system may make use of visible light, but in a preferred embodiment NIR radiation is employed.

The cover frame 22 may e.g. be provided by means of a thin metal sheet. It may be provided as a separate element or form part of a housing 42 or bracket for holding the display panel 1. In another embodiment, the cover frame 22 may be implemented as a coating or film, in one or more layers, on the front surface 3. For example, an inner layer facing the front surface 3 may provide specular and possibly partly-diffuse reflectivity, and an outer layer may block ambient and/or visible light. In one embodiment, the cover frame 22 may comprise a chromium layer provided onto the top surface 3, to obtain a surface towards the panel light guide 2 which is at least partially specularly reflective to light in the emitter wavelength. In addition, the cover frame 22 may comprise an outer layer, which is substantially black to block visible light, by oxidizing the upper surface of the chromium layer. In other embodiments, other metals, with corresponding oxides, may be used, such as aluminum, silver etc. In yet other embodiments, the specularly reflecting lower layer may be provided by means of a metal, whereas an upper layer may be provided by means of paint, e.g. black paint. In any case, the cover frame 22 is preferably substantially flat, and should be as thin as possible while providing the desired benefits of blocking IR light and visible light. In yet another embodiment, the cover frame may be disposed as an opaque frame layer between two different layers of the light guide 2, rather than on the front surface 3. This way it may be possible to obtain a flush front surface 3. In a further embodiment the cover frame 22 is disposed at the rear surface 4 of the light guide 2, and is configured to block visible light but to transmit IR. This way, the peripheral region structures are covered but light from the emitters 7 may still pass through the cover frame 22 to the light guide 2, and subsequently out through the cover frame to the detectors 8.

Figure 16:
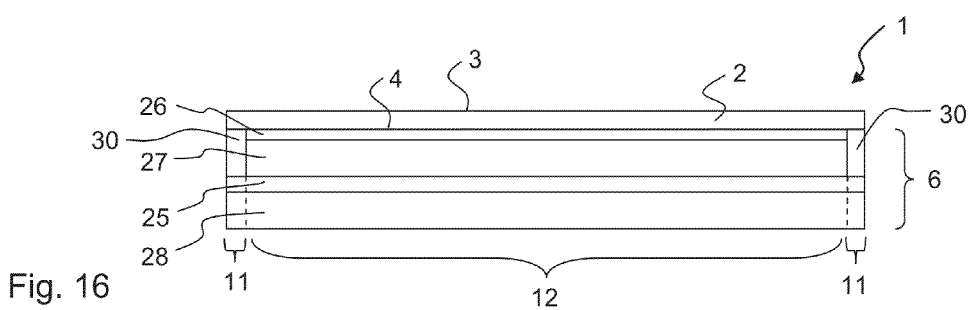
FIG. 16 is a section view of an embodiment including a TFT-LCD display unit.

FIG. 16 is a section view of an embodiment in which the display unit 6 is based on liquid crystal technology, and specifically with the display unit 6 being a TFT-LCD. The display unit 6 comprises a rear electrode layer 25, a front electrode layer 26 and an intermediate liquid crystal (LC) structure 27. The electrode layers 25, 26 are transparent and comprises a respective polarizer. The rear electrode layer 25 comprises a pixel-defining electrode structure and a TFT active matrix for pixel selection, whereby the polarization of the LC structure 27 may be selectively controlled (addressed) at the location of each pixel. The front electrode layer 26 may be implemented as a common electrode and may also comprise color filters, as is known in the art. In the illustrated embodiment, the display unit 6 further comprises a LED matrix backlight 28, which projects light for transmission through the electrode layers 25, 26 and the LC structure 27. Like in the foregoing embodiments, a light transmissive light guide 2 is arranged to define a front touch surface 3. In effect, the light guide 2 may be a sandwich structure including both color filters and polarizer, or simply be a planar cover lens, dependent on at which layer forms the rear surface 4 for reflection of the propagating light. In the illustrated embodiment, the rear electrode layer 25 is designed with detectors in its peripheral region 11. The detectors may e.g. be integrated as light-sensitive TFTs. Further details on TFT-LCDs and light-sensitive TFTs are e.g. found in WO2007/058924 and US2008/0074401, which are incorporated herein by reference.

In one embodiment, the LC structure 27 does not extend into the peripheral region 11, in order to avoid that the liquid crystal obstructs the detection of the light that is coupled out of the light guide 2. In the example of FIG. 16, the emitters are formed by dedicated LEDs in the peripheral region 11 of the backlight 28. In this embodiment, the combination of backlight 28, electrode layers 25, 26 and LC structure 27 thus forms a composite substrate in which emitters 7, detectors 8 and pixels 10 are integrated. Further, a light-coupling element 30 is arranged to direct the light from the emitters to the light guide 2 and from the light guide 2 to the detectors. The light-coupling element 30 may or may not include the above-mentioned light-directing structures.

In an alternative embodiment (not shown), all or part of the emitters are integrated in the rear electrode layer 25, e.g. in the form of LEDs or light-emitting TFTs. In a further alternative embodiment (not shown), all or part of the detectors are integrated into the backlight 28, e.g. in the form of light-sensing LEDs or TFTs. In all of these embodiments, the backlight 28 may instead be implemented to illuminate the electrode layers 25, 26 and the liquid crystal structure 27 from the side, as is known in the art.

It is to be understood that the above discussion in relation to FIG. 15 is equally applicable to the embodiment in FIG. 16.

Figure 17:
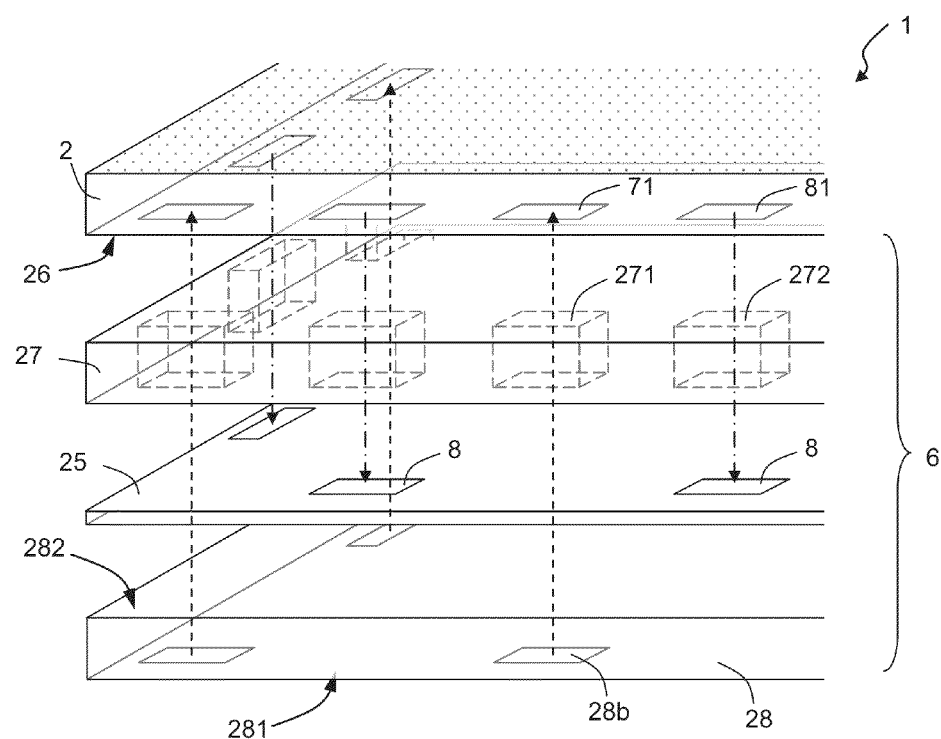
FIG. 17 is a perspective view of a corner portion of a TFT-TCD embodiment.

FIG. 17 shows another embodiment of the invention, implementing an LCD unit 6. The drawing shows a corner portion of a touch-sensing display panel 1, in which a number of elements have been vertically separated for the purpose of illustration only. Basically, the display panel 1 of this embodiment includes the LCD unit 6 and a light guide 2 which provides the touch-sensitive surface 3. At the bottom of the drawing, a backlight 28 is disposed. Light is injected into the backlight 28 from a light source (not shown), preferably through an incoupling arrangement designed to spread light within the light guide, as is well known in the art. In this embodiment the backlight 28 includes a light guide with at least one structured surface 281, functioning to lead out light upwards through the display layers. Typically it is the lower surface 281 which is structured, whereas light propagates by TIR in the upper surface of the backlight light guide 28, and preferably also in the lower surface 281 between structured areas thereof. The backlight 28 may also include a rear side reflector (not shown) for reflecting light, which escapes through the structured surface 281 of the light guide, back into the backlight light guide. Further details with regard to embodiments of the backlight 28 will now be outlined below with reference to FIG. 18-20, before returning to the embodiment of FIG. 17.

Figure 18:
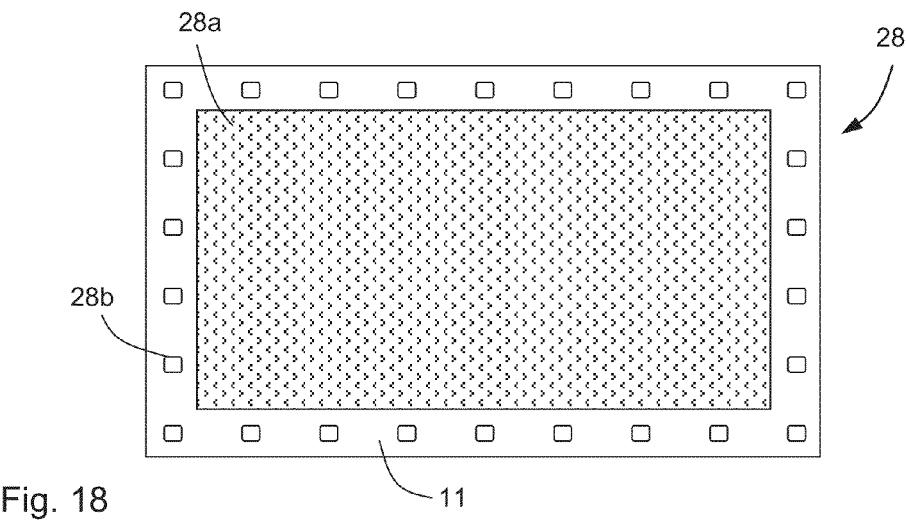
FIG. 18 is a top plan view of a backlight design for use in the TFT-TCD embodiment of FIG. 17.
Figure 19:
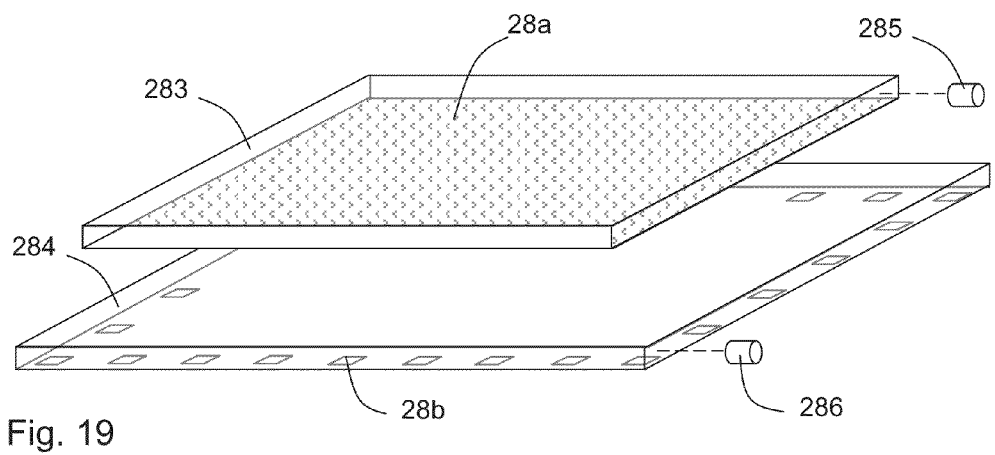
FIG. 19 shows a perspective view of a sandwiched embodiment of the backlight design of FIG. 18.
Figure 20:
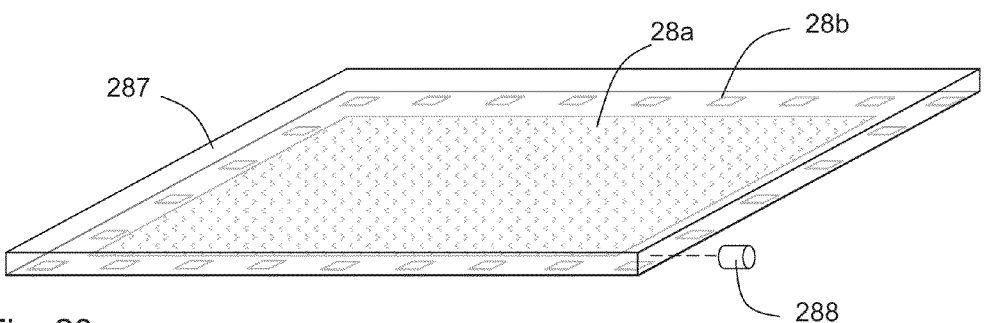
FIG. 20 shows a perspective view of an integrated embodiment of the backlight design of FIG. 18.

FIG. 18 shows a plane view of the backlight 28, whereas FIGS. 19 and 20 shown perspective views of two different ways of realizing the backlight 28. In the present embodiment, the backlight 28 is not only used for the image-forming pixels 10, but also as the light source of the emitters 7. For the first purpose, an area 28a representing the central region 12 of the lower surface 281 of the backlight 28 is structured to evenly spread light up through the upper surface 282 of the backlight 28. This is, as such, well-known technology frequently used in the art. Exact or detailed ways of structuring a surface of a backlight for this purpose will therefore not be outlined here, but typically the structured area 28a is designed with respect to where light is injected, such that not all light is leaked close to the light source. In addition to the central region structured area 28a, the backlight is also devised with a structured area 28b in the peripheral region 11. The structured area 28b preferably has a sequential design, such that light is leaked out at distinct places, where it is wanted, throughout the peripheral region 11. This way less light is wasted. In an alternative embodiment (not shown) also the peripheral region 11 may be devised with a more evenly dispersed structured area 28b, similar to the structured area 28a of the central region 12, and which light is to be led up is instead only defined by the pixel structure of the driving of the liquid crystals.

FIG. 19 shows one way of realizing the backlight 28. In this embodiment, the backlight 28 comprises two light guides; a central light guide 283 and a peripheral light guide 284, one disposed over the other in a sandwich structure. The two light guides 283, 284 may be configured with different refractive indexes for the wavelengths used, typically white light in the central region 12 and NIR in the peripheral region, so at to allow light to propagate by TIR in the respective light guides without leaking In the drawing, the central light guide 283 is only about as wide as the central region 12, i.e. the imaging part of the display. In an alternative embodiment (not shown), the central light guide 283 may be just as wide as the peripheral light guide 284, yet only provided with its structured area 28a at the central region 12. Correspondingly, it may be noted that the peripheral light guide 284 is illustrated as an entire sheet covering the central region 12 too. However, an alternative design (not shown) may include a peripheral light guide 284 that is frame-like, lacking a central portion. Such a frame-like light guide may be disposed around the central light guide 283. Such an embodiment would thus mean an arrangement where the two light guides 283 and 284 are arranged in the same plane rather than being sandwiched, which theoretically could entail a lower profile to the entire display panel 1. In the embodiment of FIG. 19, separate light sources are employed for the different purpose; a VIS light source 285 for injecting white light into the central light guide 283, and a NIR light source 286 for injecting NIR light into the peripheral light guide 284. As is known by the skilled person, plural light emitters may be used for injecting light into a light guide, and the representation of one light source for each light guide shall therefore merely be seen as an example.

FIG. 20 shows an alternative embodiment, where one and the same light guide 287 is configured to be used for both purposes. A single light source 288 is shown, but as already explained it may comprise plural emitters. In any case, light is injected in the light guide 287 within wavelength ranges for use both as imaging backlight via the central structured area 28a and for FTIR purposes via the peripheral structured area 28b. *The light source 288 may comprise a broad spectrum emitter, or may comprise several emitters devised to inject light in different wavelengths, such as VIS and NIR.*

Returning to FIG. 17, starting from the bottom this drawing shows a display panel 1 comprising an LCD unit 6 and a light guide 2. The LCD unit 6, in turn, comprises a backlight 28, an electrode 25 including a lower polarizer, a liquid crystal layer 27, and an upper electrode 26 with an upper polarizer and color filters. The peripheral structured area 28b of backlight 28 is indicated, but the drawing leaves out the central structured area 28a for the sake of clarity. As indicated by the dashed vertical arrows, the peripheral structured area 28b serves to lead out light upwards in the structure. The backlight 28 may e.g. be designed in accordance with any of the embodiments described with reference to FIGS. 18-20. It should also be noted that the arrows are symbolic and that rather a cone of light will be led out in reality, as determined by the geometry of the backlight. The electrode 25 comprises a pixel-defining structure and a TFT active matrix. In operation together with the upper electrode 26 (indicated as a lower surface of the light guide 2), the electrode 25 is configured to define pixels in the intermediate liquid crystal (LC) layer 27. Also, the TFT active matrix connect to detectors 8, to read out sensed received light. Such detectors may e.g. be photo detectors, OLEDs or similar, as previously discussed for other embodiments.

Preferably, the LC layer 27 is driven by a controller 41 using the electrodes 25, 26 according to a predetermined scheme such that the LC layer is opened at portions 271 over the structured area 28b in a certain pattern. In one embodiment, portions 271 are opened one by one in succession over each one structured area 28b, such that each portion 271 will serve as, or emulate, one emitter 7, which emitters 7 will act as flashed one by one. An incoupling arrangement 71 is configured at the rear surface 4 of the light guide, at which light is injected into the light guide 2. Emitter light is indicated in the drawing by means of dashed vertical arrows, from the structured area 28b to the light guide 2.

Once injected in the light guide 2, at least parts of the light will propagate by TIR in at least the front surface 3 to outcoupling structures 81 at the rear surface 4. Furthermore, the LC layer 27 is preferably driven by the controller 41 over the electrodes 25, 26 such that the LC layer 27 is held open, i.e. transmissive, at portions 272 over the detectors 8, below the outcoupling structures 81. This way, light coupled out from the light guide 2 is led to the detectors 8, as indicated by the vertical dash-dotted arrows.

Although this is not shown in this drawing, it has been outlined with respect to other embodiments that incoupling and outcoupling may be achieved simply by bypassing an optical layer 21 disposed under the light guide 2 over the image-forming pixels 10 in the central region 12. In addition, the incoupling and outcoupling structures may include diffusive and/or diffractive elements to direct light in or out of the light guide 2. It may be noted that the size of the portions 271 and 272 of the LC layer 27 need not be equally large, even though the drawing indicates this. Also, each such portion 271 and 272 is preferably made up of a plurality of pixels of the TFT active matrix and the LC layer 27.

While the invention has been described in connection with what is presently considered to be the most practical and preferred embodiments, it is to be understood that the invention is not limited to the disclosed embodiments, but on the contrary, is intended to cover various modifications and equivalent arrangements included within the scope of the appended claims. It should be noted that while certain features have been described in conjunction with different drawings, such features may well be combined in one and the same embodiment.

For example, it is conceivable that only the detectors 8 are integrated in the display unit 6, while the emitters 7 are otherwise installed in the display apparatus 40, e.g. as separate components. Likewise, it is conceivable that only the emitters 7 are integrated in the display unit 6, while the detectors 8 are otherwise installed in the display apparatus 40, e.g. as separate components.

In certain embodiments, the display unit 6 may comprise only one emitter 7 in combination with plural detectors 8, or only one detector 8 in conjunction with plural emitters 7. It is even conceivable that the display unit 6 has only one emitter 7 and one detector 8, e.g. to detect the presence of a touching object 5 on the touch surface 3.

Although it may be preferable that the emitter(s) 7 and the detector(s) 8 are implemented by the same technology as used for generating images in the display area, e.g. to have similar functional structure as the pixels 10, it is also possible that the detector(s) 7 or the emitter(s) 8, or both, are implemented by a different technology when integrated into the display unit 6.

As noted above, it may be desirable that the surface area of the emitters and detectors is larger than the surface area of the pixels. It is to be understood that the emitters may be larger than the detectors, and vice versa, and also that the emitters and detectors may have any shape, including circular, elliptical, and polygonal.

The invention claimed is:

1. A touch-sensing display panel, comprising:
a plurality of image-forming pixel elements;
a planar light guide with a first refractive index, the planar light guide having a front surface forming a touch-sensing region and an opposite rear surface facing the plurality of image-forming pixel elements;
a plurality of light emitters arranged at a peripheral region of the touch-sensing display panel to emit light into the planar light guide for propagation therein through total internal reflection in at least the front surface;
a plurality of light detectors at the peripheral region for receiving light from the planar light guide; and
an optical layer at the rear surface of the planar light guide to cover image-forming pixel elements in at least a central region of the touch-sensing display panel,
wherein said optical layer is configured to reflect at least a part of the light from the plurality of light emitters impinging thereon from within the planar light guide,
wherein the optical layer has a second refractive index, which is less than the first refractive index, and
wherein an extension portion of the optical layer is arranged over the plurality of light emitters, said extension portion having a third refractive index, which is greater than the second refractive index.

2. The touch-sensing display panel of claim 1, wherein the third refractive index is greater than or equal to the first refractive index.

3. The touch-sensing display panel of claim 1, wherein the extension portion of the optical layer covers said peripheral region.

4. The touch-sensing display panel of claim 1, wherein the plurality of light emitters are coupled to emit light into the planar light guide, which light bypasses a main portion of the optical layer.

5. The touch-sensing display panel of claim 1, wherein said plurality of light emitters and said plurality of image-forming pixel elements are OLED elements.

6. The touch-sensing display panel of claim 1, wherein the plurality of light emitters are integrated with the plurality of image-forming pixel elements in the touch-sensing display panel.

7. The touch-sensing display panel of claim 1, wherein said plurality of light emitters are behind the plurality of image-forming pixel elements, and configured to emit light through the plurality of image-forming pixel elements and into the planar light guide.

8. The touch-sensing display panel of claim 1, wherein the extension portion of the optical layer is also arranged over the plurality of light detectors.

9. The touch-sensing display panel of claim 1, wherein said plurality of light detectors are coupled to receive light from the planar light guide, which light bypasses a main portion of the optical layer.

10. The touch-sensing display panel of claim 1, wherein said plurality of light detectors are OLED elements.

11. The touch-sensing display panel of claim 1, wherein the plurality of light detectors are integrated with the plurality of image-forming pixel elements in the touch-sensing display panel.

12. The touch-sensing display panel of claim 1, wherein the plurality of light detectors are functionally arranged in a number of detector subsets, wherein the light detectors of one subset are configured to operate as one larger area light detector.

13. The touch-sensing display panel of claim 1, wherein said plurality of light detectors and said plurality of image-forming pixel elements are stacked OLEDs, and wherein the plurality of light detectors are configured to detect light from the planar light guide through the plurality of image-forming pixel elements.

14. The touch-sensing display panel of claim 1, wherein at least one of said plurality of light detectors is behind a portion of the plurality of image-forming pixel elements.

15. The touch-sensing display panel of claim 1, further comprising:
a light output mechanism arranged to lead out light from the planar light guide to the plurality of light detectors.

16. The touch-sensing display panel of claim 1, wherein said planar light guide is a substrate of the touch-sensing display panel on which said plurality of image-forming pixel elements are formed, and said planar light guide is sealed at an edge portion to a cover on the opposing side of the plurality of image-forming pixel elements.

17. The touch-sensing display panel of claim 1, wherein said plurality of image forming pixel elements are on a substrate, which is sealed at an edge portion to a light guide cover, which is on the opposing side of the plurality of image-forming pixel elements.

18. The touch-sensing display panel of claim 1, wherein said plurality of image-forming pixel elements are configured to operate in the visible range, whereas the plurality of light emitters and plurality of light detectors are configured to operate in the IR range.

19. The touch-sensing display panel of claim 1, wherein a grid of propagation paths is defined across the touch-sensing region between pairs of the plurality of light emitters and plurality of light detectors.

20. The touch-sensing display panel of claim 1, further comprising:
an LCD unit having a central region controlled to operate as said plurality of image-forming pixel elements, and a peripheral region controlled to pass light from the planar light guide to the plurality of light detectors.

21. The touch-sensing display panel of claim 1, further comprising:
an LCD unit including a backlight, wherein the LCD unit is controlled to emulate said plurality of light emitters by passing light from the backlight through selected portions of the LCD unit.

22. An electronic device comprising:
the touch-sensing display panel of claim 1, and
a controller configured to cause the plurality of image-forming pixel elements to display information content within at least part of a touch surface while causing touch-sensor elements to provide touch sensitivity within said at least part of the touch surface.

\* \* \* \* \*